(12) United States Patent
Dooley et al.

(10) Patent No.: US 7,733,940 B2
(45) Date of Patent: Jun. 8, 2010

(54) METHOD AND APPARATUS FOR SIGNAL RECEIPT AND ACQUISITION

(75) Inventors: Saul R. Dooley, Reigate (GB); Amites Sarkar, Crawley (GB); Andrew T. Yule, East Grinstead (GB)

(73) Assignee: NXP B.V., Eindhoven (NL)

( * ) Notice: Subject to any disclaimer, the term of this patent is extended or adjusted under 35 U.S.C. 154(b) by 1461 days.

(21) Appl. No.: 10/319,895

(22) Filed: Dec. 13, 2002

(65) Prior Publication Data

US 2003/0128743 A1 Jul. 10, 2003

(30) Foreign Application Priority Data

Dec. 22, 2001 (GB) .................... 0130804.8

(51) Int. Cl.
*H04B 1/00* (2006.01)

(52) U.S. Cl. .............. 375/147; 375/130; 375/316; 370/210; 370/320; 370/342; 702/77; 708/403; 708/404

(58) Field of Classification Search ........... 375/147, 375/130, 316; 370/210, 320, 342; 342/196; 702/77; 708/403, 404
See application file for complete search history.

(56) References Cited

U.S. PATENT DOCUMENTS

| 3,735,403 | A | * | 5/1973 | Sykes | 342/158 |
| 5,999,119 | A | * | 12/1999 | Carnes et al. | 342/135 |
| 6,005,889 | A | * | 12/1999 | Chung et al. | 375/140 |
| 6,898,176 | B1 | * | 5/2005 | Cruickshank et al. | 370/210 |

FOREIGN PATENT DOCUMENTS

| EP | 1107018 A2 | 6/2001 |
| JP | 2001-237744 A | 8/2001 |
| KR | 2001-106122 A | 11/2001 |
| WO | WO9926370 | 5/1999 |
| WO | 99/63501 A1 | 12/1999 |

OTHER PUBLICATIONS

S.M. Spangenberg et al; "Code Acquisition for LEO Satellite Mobile Communication Using a Serial-Parallel Correlator With FFT for Doppler Estimation", Proceedings of First International Symposium on Communication Systems and Digital Signal Processing, 1998, Proceedings of IST International Symposium on Communications Systems and Digital Signal Processing, Sheffield, UK, Apr. 6-8, 1998, pp. 328-333, vol. 1, XP002230502.

Dillard, G., et al. "Mean-Level Detection in the Frequency Domain", IEE Proc.—Radar, Sonar & Navigation, vol. 143, No. 5, pp. 307-312 (Oct. 1996).

Spillard, et al. "A Serial-Parallel FFT Correlator for PN Code Acquisition from LEO Satellites", Spread Spectrum Techniques & Applications, vol. 2, pp. 446-448 (Sep. 1998).

* cited by examiner

*Primary Examiner*—Mohammad H Ghayour
*Assistant Examiner*—Leila Malek

(57) ABSTRACT

The present invention provides for a method of receiving a signal spread over a frequency range, and in particular a direct sequence spread spectrum signals including the step of employing a Fast Fourier Transform (FFT) in the Doppler search. In particular, the invention relates to the receipt of spread spectrum signals such as those transmitted as part of a GPS system.

14 Claims, 3 Drawing Sheets

SELECT BIN WITH MAXIMUM MAGNITUDE - THEN COMPARE TO DETECTION THRESHOLD

—— DOUBLE FFT COMBINER   - - - - - - REGULAR FFT COMBINER

METHOD AND APPARATUS FOR SIGNAL RECEIPT AND ACQUISITION

FIELD OF INVENTION

The present invention provides for a method of receiving a signal through detection of a carrier frequency and to a method of receiving a signal spread over a frequency range such as a direct sequence spread spectrum signal, and including the step of employing a Fast Fourier Transform (FFT) in the Doppler search. In particular, the invention relates to the receipt of spread spectrum signals such as those transmitted as part of a GPS system.

BACKGROUND TO INVENTION

Current GPS receivers and operating methods seek to acquire the GPS signals transmitted from a constellation of satellites so as to perform pseudorange calculations in order to determine the respective distances from the receiver to each of the satellites. The acquisition of the GPS signals is achieved by means of energy detection at the output of the received, and despread, signal and this approach involves the tuning of a code signal generated locally by the receiver but taking account of possible phase and frequency offsets which are anticipated as likely by the receiver. When the phase of the despread signal and the local generated code signal are within the specified limits, the detector then produces an output which exceeds some threshold value and the receiver can then register the presence of the desired signal. This initial acquisition of the signal then triggers verification and tracking steps which attempt to continuously maintain close alignment between the two code sequences in order to track any incoming signal fluctuation. If the signal phase and frequency offsets are not within the desired limits, the output of the detector will fail to reach the threshold value and so the search for initial acquisitions will continue.

Because of the Doppler effect that can be introduced into the incoming signals due to relative motion between the receiver and the satellite, it is anticipated that the incoming GPS satellite signals can be represented within a broad range of frequencies.

A GPS receiver commonly employs a plurality of search bins the number of which is determined by the number of possible code phase offsets and the total range of possible Doppler offsets.

Current GPS implementations do not allow GPS reception in areas of significant GPS signal attenuation such as in so-called urban canyons or indoor locations. While current receivers integrate for a maximum of 1 ms it is appreciated that, the longer the integration time, the greater the sensitivity that can be achieved. With very long integration periods, it would be possible to receive GPS signals in extremely harsh signal environments such as indoors.

It is appreciated that there is a combined sensitivity/acquisition time trade-off for GPS receivers. Although sensitivity can be readily improved, this has an adverse effect on acquisition time. With current implementations involving serial searches, this proves problematic because there is a non-linear relationship between sensitivity and acquisition time. For example, it has previously been noted that processing gain is achieved by reducing the noise variance of the integrated power. This can be achieved either coherently and/or non-coherently. The gain and search time as a function of non-coherent power sums N, and the coherent pre-detection interval (PDI) in milliseconds, can be represented as:

Processing gain=10 log [PDI$\sqrt{N}$] dB.

Search time increases=the PDI (due to increased PDI)×the PDI (due to frequency step reduction)×$N$ (number of non-coherent sums)=$N$×(PDI)$^2$.

It should be appreciated that the non-coherent case comprises the non-coherent summing of more than one chunk, where each chunk is itself summed coherently.

For a 100 ms search time therefore with coherent PDI=10 ms and 10 non-coherent sums, the processing gain is 15 dB but the search time increases by a factor of 1000.

Acquisition time then becomes problematic since if 15 dB gain is required to detect the signal, the acquisition time goes up from in the region of 1 second to over half an hour.

What would therefore be advantageous is a long integration technique so as to enable high sensitivity but which would not severely impact computation, and thus acquisition, time. It would also be valuable to have a technique that will prove effective without requiring assistance messaging.

It is known from WO-A-99/26370 to seek to reduce the said acquisition time by searching for all possible Doppler codes simultaneously by the employment of a Fast Fourier Transform (FFT) as part of the acquisition system. This document discloses the use of an FFT combiner which is thought advantageous in that it enables a broad range of frequencies which might contain GPS signals to be searched simultaneously thereby reducing the time required to achieve signal fix. Without employing such an FFT combiner, the range of frequencies that can be searched simultaneously is disadvantageously limited and multiple searches must then be carried out which disadvantageously exhibit time delays.

However, such known FFT combiners nevertheless exhibit disadvantages in that they experience so-called scalloping losses between each of the bins.

In further detail, the FFT combiner such as that of WO-A-99/26370 uses a FFT to estimate the correct Doppler. The FFT is a complex-valued transform and the K-point FFT of a sampled signal x(kT$_s$) of length K is $$X(l) = \sum_{k=0}^{K-1} x(kT_s)e^{-j2\pi\frac{kl}{K}}$$

The value of l for which the magnitude of X(l) is maximum indicates the strongest frequency component in x(kT$_s$). Most signal processing texts discuss FFTs with some detail and FFTs are amenable to numerous efficient hardware or software implementations and can be employed in the context of code correlation.

The known FFT combiner technique functions as follows. First, a "chunk size" of N samples is defined e.g. N=4800 corresponds to 1 ms chunks in a receiver set up using 4.8 MHz sampling frequency. Correlation with a satellite PN code of interest is carried out and after integration for the N samples, the result is stored. This is repeated for K consecutive sets of N samples, so that KN samples in total are processed. The FFT of the K integration results is then obtained and if the satellite signal is present, a peak is clearly visible. If this is true then the FFT bin corresponding to this peak will correspond to the Doppler shift of the signal.

The whole procedure is represented diagrammatically in FIG. 2 using a "serial" approach, i.e. the integration results are obtained sequentially. A parallel implementation is also possible for matched filter approaches, as is described in WO-A-99/26370 where the matched filter is divided into K subsections and integration results from each "partial" matched filter are subjected to the FFT.

In comparison to a standard serial search, the proposal in effect searches K Doppler bins simultaneously using the FFT Combiner and hence exhibits a relatively short time-to-first-fix. This difference is clear from FIG. 3 where it can be seen that the FFT combiner appears nearly equivalent to K separate Doppler serial searches centred, in this example, every 1 kHz.

However, it is noted that the FFT combiner incurs a sensitivity loss of up to −4 dB; a so-called scalloping loss, at various values of Doppler error when the integration time increases beyond 1 ms, as can be seen from FIG. 4.

OBJECT OF INVENTION

The present invention seeks to provide for a GPS receiver and operating method exhibiting advantages over such receivers and methods.

SUMMARY OF INVENTION

According to one aspect of the present invention there is provided a method of receiving a signal by detection of a carrier frequency including the step of employing a FFT to determine the received frequency by means of a first FFT combiner, characterized by the step of employing a second FFT combiner having a frequency offset with respect to the said first combiner.

Through appropriate choice of the frequency offset, and since the dips in the FFT combiner characteristic occur at known points, the characteristic of the shifted FFT combiner will have maxima at the dips of the standard FFT combiner, and vice versa. Thus, through using both FFTs, significant sensitivity losses can be avoided if the Doppler error should happen to be in the vicinity of one of such said dips.

The features of Claim 2 confirms the frequency offset for such a double FFT combiner.

The features of Claims 3-6 relate to further advantageous embodiments in which the scalloping loss experienced can be further reduced, particularly if the additional computational complexity is not thought to be disadvantageously prohibitive.

According to another aspect of the present invention there is provided a method as claimed in any of the preceding Claims, wherein the signal to be received comprises a spread spectrum signal.

BRIEF DESCRIPTION OF DRAWINGS

The invention is described further hereinafter, by way of example only, with reference to the accompanying drawings in which.

DETAILED DESCRIPTION

Figure 1:
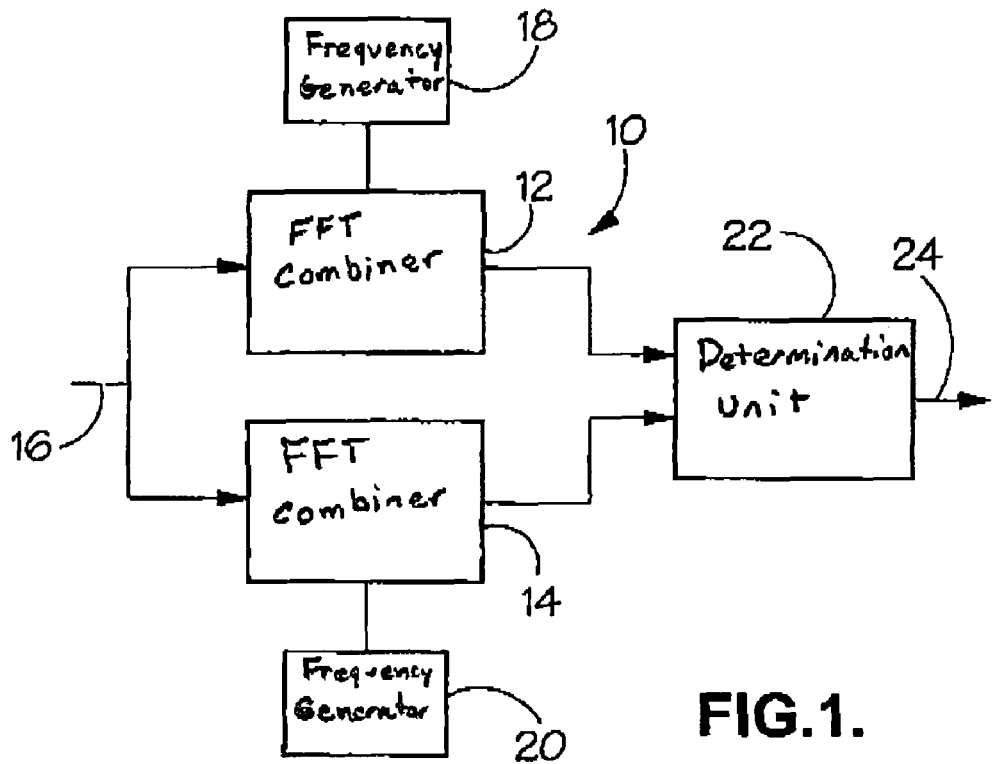
FIG. 1 is a block diagram of a GPS receiver embodying the present invention.

Turning first to FIG. 1, there is illustrated, in schematic block format, a portion 10 of a GPS receiver employing functionality embodying the present invention. The illustrated portion 10 of the GPS receiver comprises a first FFT combiner 12 and a second FFT combiner 14 both of which are arranged to receive a signal comprising the integrated correlation results 16 established within the GPS receiver 10. Importantly, the two FFT combiners 12, 14 are driven by respective frequency generators 18, 20 which are mutually offset. In the illustrated example, the FFT combiner 12 is driven at 0 Hz offset, while the FFT combiner 14 is driven at 25 Hz offset.

The two FFT combiners 12, 14 provide outputs which are both delivered to a determination unit 22 serving to determine frequency estimates from the two sets of FFT coefficients received from the two FFT combiners 12, 14. The determination unit 22 then provides a frequency estimate signal 24 as an output.

Figure 2:
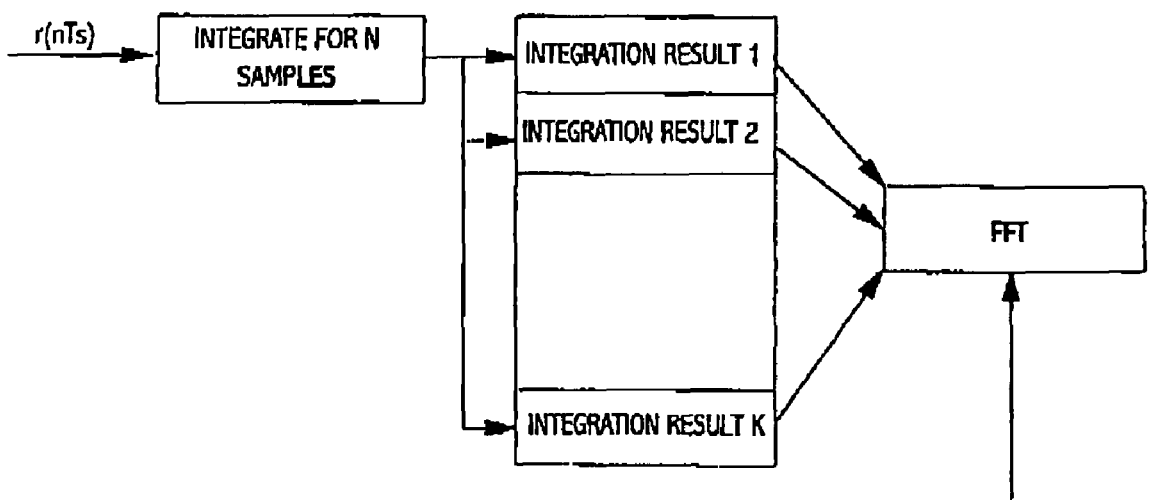
FIG. 2 is a diagrammatic representation of an FFT combiner employing a serial approach.
Figure 3:
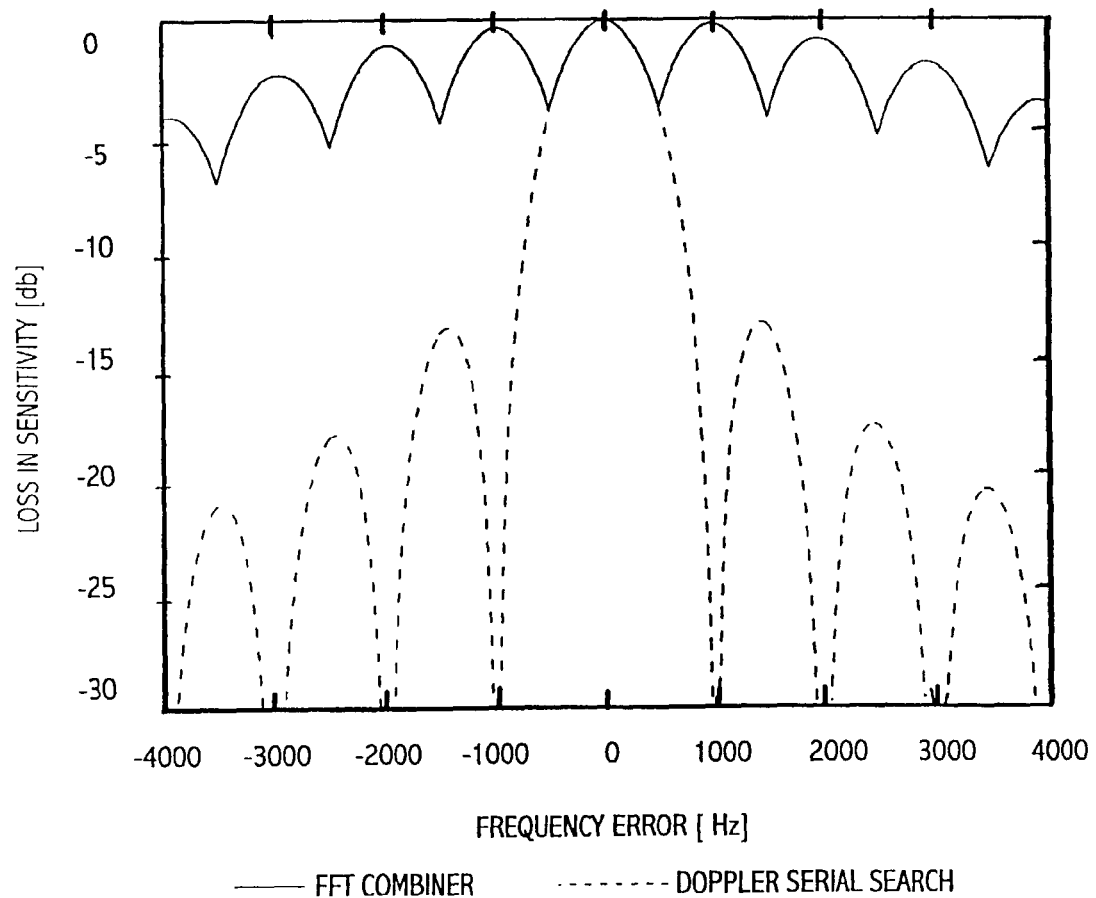
FIG. 3 is a graphical illustration of the sensitivity loss of a common FFT combiner as compared to Doppler serial search.

As mentioned previously, FIG. 2 is a diagrammatic representation of the operation with a standard FFT combiner employing predetermined chunk sizes of N samples for K consecutive sets of N samples. As also discussed previously, FIG. 3 illustrates the improvement in time-to-first-fix that can be achieved with an FFT combiner as compared with, for example, K separate Doppler serial searches.

Figure 4:
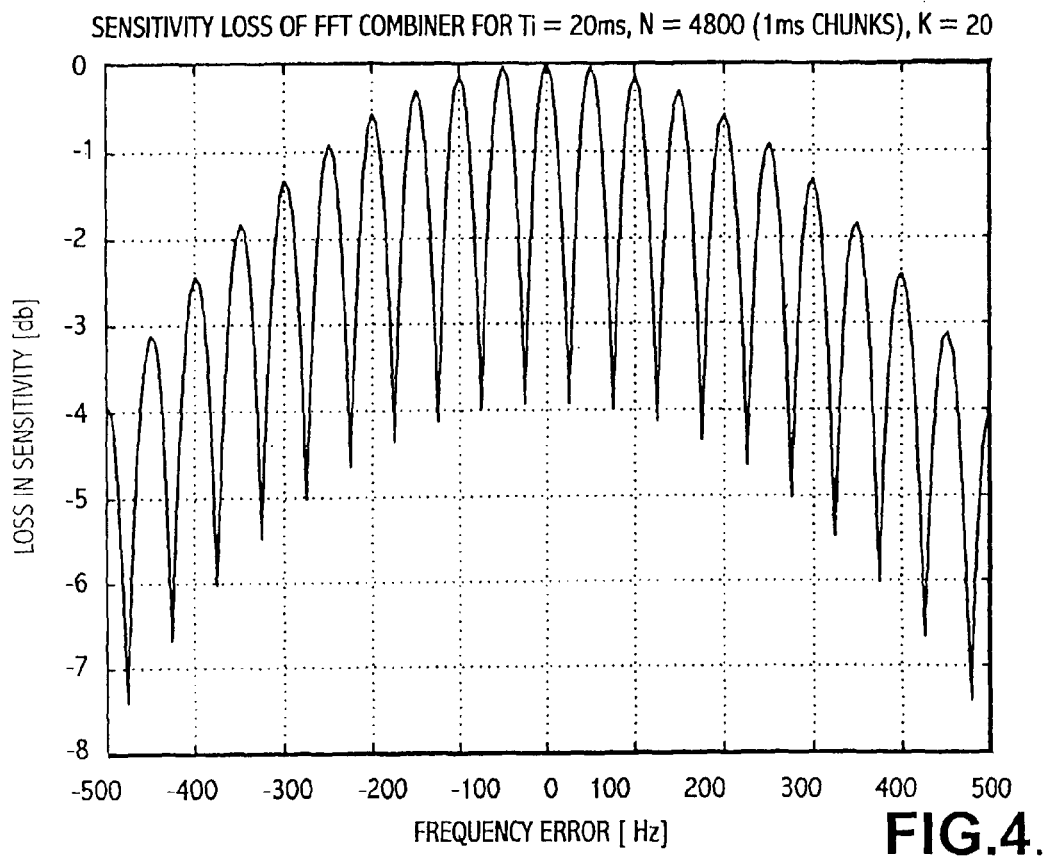
FIG. 4 is a graphical representation of the sensitivity loss for a FFT combiner with a different integration time.

However, as previously discussed, the FFT combiner incurs a sensitivity loss of up to −4 dB, i.e. the so-called scalloping loss, at various values of Doppler error when the integration time increases beyond 1 ms as is illustrated in FIG. 4.

This so-called "scalloping loss" is due to FFT resolution, which depends on FFT bin size:

$$L_{\mathit{fft}} = \left| \frac{\sin\frac{K}{2}\left(\omega_e NT_s - \frac{2\pi l}{K}\right)}{K\sin\frac{1}{2}\left(\omega_e NT_s - \frac{2\pi l}{K}\right)} \right|$$

This is the error included when the actual residual Doppler lies between two consecutive FFT bins, which correspond to discrete frequencies. As will be appreciated from the above relationship, the loss depends on K and the value of the actual residual frequency. Thus, the closer the residual Doppler is to an FFT bin, the smaller the loss will be the worst case is when the residual Doppler lies half way between consecutive bins.

Such losses are further discussed as follows:

The coherent combining loss is maximum when $N\omega_e T_d/2 = n\pi$ where n is any integer not equal to 0. This should be obvious from the numerator of $L_{coh}$ as $\sin(n\pi)=0$ for any integer n. Note for n=0, both the numerator and denominator are zero but $L_{coh}$ can be proved to be unity. Equivalently, this is when $w_e = 2\pi n/NT_s$. However, one usually refers to the frequency "range" for a particular integration time to be approximately $\pm\frac{1}{2}T_{ci}$ Hz, e.g. a ±500 Hz range for a 1 ms integration, so the present discussion will be confined to this range. That is, for 1 ms integration times, it is normal to use steps of 1 kHz for the Doppler search in a standard Doppler serial search technique.

The coherent combining loss reaches its worst case in the $\pm\frac{1}{2}T_{ci}$ Hz frequency range when at either edge, i.e. $\omega_e = \pi/T_{ci}$, where the coherent integration time $T_{ci} = NT_s$. Substituting this value leads to:

$$L_{coh} = \left| \frac{\sin\frac{\pi N T_s}{2T_{ci}}}{N\sin\frac{\pi T_s}{2T_{ci}}} \right|$$

$$= \left| \frac{\sin\frac{\pi}{2}}{N\sin\frac{\pi}{2N}} \right|$$

$$\approx \frac{2}{\pi}$$

for large N. Hence the coherent combining loss for a $\pm\frac{1}{2}T_{ci}$ Hz Doppler error is $$\text{Coherent combining Loss} = 20\log_{10}\left(\frac{2}{\pi}\right) \approx -4 \text{ dB}$$

Thus, for a 1 ms integration, at 500 Hz, the sensitivity loss is approximately −4 dB. This worst case corresponds to having a "half cycle" of I and Q in the integration period, and thus one of them integrates to zero in the integration period. In effect 3 dB has been lost from integrating/to zero, and 1 dB from Q.

Thus, as suggested, the scalloping loss will be worst when the actual residual frequency lies between two consecutive FFT bins. Hence, we can evaluate this worst case loss by $$L_{fft}(\text{worst case}) = \left| \frac{\sin\frac{K}{2}\left(\frac{2\pi}{2K}\right)}{K\sin\frac{1}{2}\left(\frac{2\pi}{2K}\right)} \right|$$

$$= \left| \frac{\sin\frac{\pi}{2}}{K\sin\frac{\pi}{2K}} \right|$$

$$= \frac{1}{K}\left| \frac{1}{\sin\frac{\pi}{2K}} \right|$$

As K increases, and using the fact that $\sin(x) \approx x$, then the loss (in dB) is limited to $$\text{Scalloping Loss (max)} = 20\log_{10}\left(\frac{2}{\pi}\right) \approx -4 \text{ dB}$$

Hence, a worst case scenario for the FFT combiner is limited to incurring a sensitivity loss of −8 dBs (−4 dBs from the coherent and −4 dBs from the scalloping losses). In practice, the worst case Doppler error for the coherent loss is not the worst case Doppler for the scalloping loss, so the worst case loss is often slightly less.

As mentioned, FIG. 4 shows the sensitivity loss of the FFT combiner for $T_i$=20 ms using 1 ms chunks. There is a dip in the characteristic every odd multiple of 25 Hz (which is equal to $\frac{1}{2}T_i$ Hz). This means for a Doppler error corresponding to say 25 Hz then we shall incur the maximum −4 dB scalloping loss.

Figure 5:
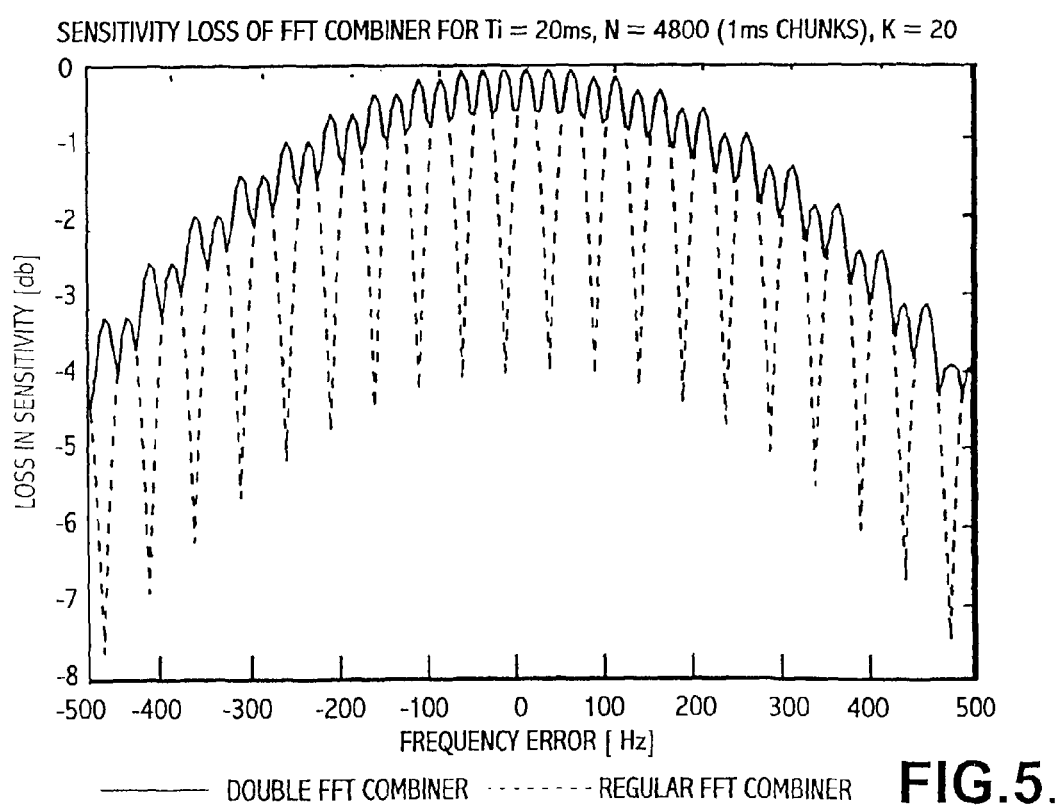
FIG. 5 is a graphical illustration of the sensitivity loss employed with a double FFT combiner employing an embodiment of the present invention.

The results achieved in accordance with the embodiment of the present invention are illustrated in FIG. 5 which also includes a trace corresponding to the regular FFT combiner as illustrated in FIG. 4.

The embodiment of a Double FFT combiner requires 2 FFTS, one standard FFT, and one FFT with a frequency offset of $$\frac{1}{2T_i} \text{ Hz}.$$

As the "dips" in the FFT combiner characteristic occur at known points $$\left(\text{odd multiples of } \frac{1}{2T_i} \text{ Hz}\right),$$

then the characteristic of the shifted FFT combiner will have maxima at the dips of the standard FFT combiner (and vice versa). This implies, by using both FFT's, we can avoid significant sensitivity losses if the Doppler error occur in the vicinity of one of these dips.

Using both FFT combiners and observing for the presence of a peak in both sets of outputs, the scalloping loss is advantageously much reduced. The worst case scalloping loss is now $$L_{fft}(\text{worst case}) = \left| \frac{\sin\frac{K}{2}\left(\frac{2\pi}{4K}\right)}{K\sin\frac{1}{2}\left(\frac{2\pi}{4K}\right)} \right|$$

$$= \left| \frac{\sin\frac{\pi}{4}}{K\sin\frac{\pi}{4K}} \right|$$

$$= \frac{1}{\sqrt{2}\,K}\left| \frac{1}{\sin\frac{\pi}{4K}} \right|$$

As K increases, and using the fact $\sin(x) \approx x$ then the loss (in dB) is limited to $$\text{Scalloping Loss (max)} = 20\log_{10}\left(\frac{2\sqrt{2}}{\pi}\right) \approx -0.9 \text{ dB}$$

Hence the worst case loss has been reduced from −4 dB to just −0.9 dB.

The combination of both FFT combiners has a characteristic shown in FIG. 5. The "double FFT combiner" has a much reduced scalloping loss as predicted.

In summary, the FFT combiner gives the processing gain of integrating over $T_i$=KNT$_S$ seconds but only the sensitivity loss associated with integrating over NT$_s$ seconds (coherent combining loss) plus a scalloping loss.

The coherent combining loss can be made arbitrarily small for Doppler errors of interest by reducing the coherent chunk size N, at the expense of increasing computational complexity. The Doppler error which causes maximum sensitivity loss is inversely proportional to N. Therefore, N can be selected to be small enough to force this frequency error to be beyond the maximum practical Doppler error, which makes the receiver impervious to such a loss.

As noted, the worst case scalloping loss, which is −4 dB, can be reduced to −0.9 dB by the use of Double FFT combiner. Naturally, this could be further reduced by using a triple or quadruple FFT combiner, using the same principle of frequency shifting each FFT combiner as was used to derive the double FFT combiner, but the double FFT combiner appears a good trade-off between recovering the sensitivity loss and increasing computational complexity.

It should be appreciated that the FFT combiner is illustrated in the context of doing a large (±4 kHz) frequency search, the technique can equally be applied to finer grain frequency searching by increasing N and decreasing K.

Also, the invention is not restricted to use within a GPS system but can be used in any system in which a signal needs to be detected over a frequency rage.

The invention claimed is:

1. A method of receiving a signal by detection of a carrier frequency, the method comprising: employing a first fast Fourier transform (FFT) combiner to determine the carrier frequency; driving the first FFT combiner with a first frequency generator; and employing at least one further FFT combiner; driving the at least one further FFT combiner with a second frequency generator, wherein the first and second frequency generators are mutually offset in frequency such that a sensitivity loss that is incurred by the at least one further FFT combiner has maxima at Doppler error values where a sensitivity loss that is incurred by the first FFT combiner has dips and the sensitivity loss that is incurred by the first FFT combiner has maxima at Doppler error values where the sensitivity loss that is incurred by the at least one further FFT combiner has dips, wherein the employing the at least one further FFT combiner with the first FFT combiner reduces a scalloping loss.

2. A method as claimed in claim 1, wherein the frequency offset is $½T_i$ Hz, wherein $T_i$ represents an integration time of the receiver.

3. A method as claimed in claim 1 and employing two further FFT combiners so as to provide a triple FFT combiner.

4. A method as claimed in claim 3, wherein the offset is $⅓T_i$ Hz, wherein $T_i$ represents an integration time of the receiver.

5. A method as claimed in claim 1, and employing three further FFT combiners to provide a quadruple FFT combiner.

6. A method as claimed in claim 5, wherein the frequency offset of each combiner is $¼T_i$ Hz, wherein $T_i$ represents an integration time of the receiver.

7. A method as claimed in claim 1, wherein the signal comprises a direct sequence spread spectrum signal.

8. A method as claimed in claim 1, wherein the carrier to be detected comprises a data and a (pseudo random noise) PRN modulated carrier.

9. A method as claimed in claim 1, wherein the signal to be received comprises a spread spectrum signal.

10. A signal receiver for receiving a signal by means of detection of a carrier frequency and comprising: a first fast Fourier transform (FFT) combiner to determine the carrier frequency; a first frequency generator configured to drive the first FFT combiner; a second FFT combiner; a second frequency generator configured to drive the second FFT combiner, wherein the first and second frequency generators are mutually offset such that a sensitivity loss that is incurred by the second FFT combiner has maxima at Doppler error values where a sensitivity loss that is incurred by the first FFT combiner has dips and the sensitivity loss that is incurred by the first FFT combiner has maxima at Doppler error values where the sensitivity loss that is incurred by the second FFT combiner has dips, using the second FFT combiner with the first FFT reduces a scalloping loss.

11. A receiver as claimed in claim 10, wherein the frequency offset is $½T_i$ Hz, wherein $T_i$ represents an integration time of the receiver.

12. A global position system (GPS) device, comprising:
a receiver having:
a first Fast Fourier Transform (FFT) combiner;
a first frequency generator configured to drive the first FFT combiner;
a second FFT combiner;
a second frequency generator configured to drive the second FFT combiner,
wherein the first and second frequency generators are mutually offset such that a sensitivity loss that is incurred by the second FFT combiner has maxima at Doppler error values where a sensitivity loss that is incurred by the first FFT combiner has dips and the sensitivity loss that is incurred by the first FFT combiner has maxima at Doppler error values where the sensitivity loss that is incurred by the second FFT combiner has dips, using the second FFT combiner with the first FFT combiner reduces a scalloping loss.

13. A GPS device as claimed in claim 12, further comprising one additional FFT combiners, which provide a triple FFT combiner.

14. A GPS device as claimed in claim 12, further comprising two additional FFT combiners, which provide a quadruple FFT combiner.

* * * * *